United States Patent [19]
Ohmori et al.

[11] 3,971,049
[45] July 20, 1976

[54] SYSTEM FOR RECORDING ON THE FILM OF A CAMERA DATA RELATING TO THE SCENE BEING PHOTOGRAPHED

[75] Inventors: Sachio Ohmori, Yokohama; Kouichi Takahata, Tokyo, both of Japan

[73] Assignee: Nippon Kogaku K.K., Tokyo, Japan

[22] Filed: May 13, 1974

[21] Appl. No.: 469,532

[30] Foreign Application Priority Data
May 17, 1973  Japan.......................... 48-57278[U]

[52] U.S. Cl.................................. 354/127; 354/32; 354/33; 354/35; 354/60 F; 354/105; 354/129; 354/145
[51] Int. Cl.²......................................... G03B 15/02
[58] Field of Search ................ 354/145, 33, 27, 32, 354/35, 60 F, 129, 127, 128, 105

[56] References Cited
UNITED STATES PATENTS
3,727,100   4/1973   Kuraishi et al...................... 354/33

*Primary Examiner*—L. T. Hix
*Assistant Examiner*—Russell E. Adams, Jr.
*Attorney, Agent, or Firm*—Shapiro and Shapiro

[57] ABSTRACT

A data photographing system has a flash capacitor which is charged by a power source and discharged through a flash tube in response to a trigger signal for illuminating data, and has a control circuit for producing the trigger signal only if the flash capacitor has been charged to a predetermined voltage level. The control circuit includes a voltage detector, such as a Zener diode, and a synchronizing switch adapted to be closed in response to actuation of the shutter release mechanism of the camera. The control circuit may also include a trigger capacitor which is charged by the power source and which is discharged through the primary winding of a transformer to produce a trigger signal of stepped-up voltage across the secondary winding of the transformer. The trigger capacitor may be discharged directly through the Zener diode and the synchronizing switch or through an SCR controlled thereby.

16 Claims, 5 Drawing Figures

SYSTEM FOR RECORDING ON THE FILM OF A CAMERA DATA RELATING TO THE SCENE BEING PHOTOGRAPHED

BACKGROUND OF THE INVENTION

1. Field of the Invention

This invention relates to a data photographing system which, when pictures are taken by a camera, triggers an electronic flash to record data, such as memoranda, the date or the time, on the camera film.

2. Description of the Prior Art

The recent development of motor-driven camera systems has made popular continuous photography and remote photography. In these types of photography it is desirable that, in addition to the scene to be photographed, certain data, such as memoranda, the date or the time, also be recorded on the film.

Conventional devices for photographing such data have a pilot lamp which turns on when a capacitor has been charged up to the particular voltage level required to energize a flash tube which is provided for illuminating the data. The flash tube is energized in response to actuation of the shutter opening mechanism of the camera after turn-on of the pilot lamp has been confirmed by the photographer so that the data are photographed at the same brightness as that of the main scene which is recorded on the film frame. However, turn-on of the pilot lamp cannot be readily confirmed during remote photography. Moreover, when continuous photography is effected by means of a motor-driven device, confirmation of the turn-on of the pilot lamp is irrevelant because the picture-taking cycle is predetermined. If photography is effected prior to turn-on of the pilot lamp, the data will suffer from underexposure as compared with the intensity of the main scene exposed film surface area.

When continuous photography is effected at a rate of several frames per second, the flash capacitor must be charged and discharged several times per second, which requires the power source to be of such large capacity that the data photographing apparatus is undesirable in terms of its portability. However, where the datum to be recorded is the time, time periods of 1 second or less are difficult to read whether the timepiece used is the three-hand analog display type or the digital display type. Therefore, when timepieces of these types are photographed, there is no practical advantage in photographing the time at a rate higher than one frame per second. Thus, it may be said that continuously varying data, such as the time, are recorded sufficiently for practical purposes if they are photographed on the film at a rate which enables clear identification of the variations in such data.

SUMMARY OF THE INVENTION

Accordingly, a principal object of the present invention is to provide a data photographing system which eliminates the need for confirming turn-on of the pilot lamp so that the system can be used with continuously operated or remotely controlled cameras; which only requires a power source of small size for charging the flash capacitor; and which enables all data to be photographed on the camera film with uniform brightness.

Briefly stated, a data photographing system in accordance with the present invention includes a flash capacitor, a charging circuit for charging the flash capacitor, a discharge circuit including a flash lamp for discharging the flash capacitor in response to a trigger signal to produce a flash of light for illuminating the data, and a control circuit including a voltage detector for detecting the voltage across the flash capacitor and a synchronizing switch which is adapted to be closed in response to actuation of the shutter release mechanism of the camera for causing the control circuit to produce the trigger signal upon closing of the synchronizing switch only if the flash capacitor has been charged to a predetermined level.

The voltage detector may comprise a Zener diode. The control circuit may include a trigger capacitor which is charged by the power source and which discharges through the primary winding of a transformer to produce a trigger signal of stepped-up voltage across the secondary winding of the transformer. The trigger capacitor may be discharged directly through the Zener diode and the synchronizing switch or through an SCR controlled thereby. An amplifier may be provided for amplifying the signal applied to the gate terminal of the SCR.

BRIEF DESCRIPTION OF THE DRAWINGS

The invention will be further described with reference to the accompanying drawings, which illustrate preferred and exemplary embodiments, and wherein.

DESCRIPTION OF THE PREFERRED EMBODIMENTS

Figure 1:
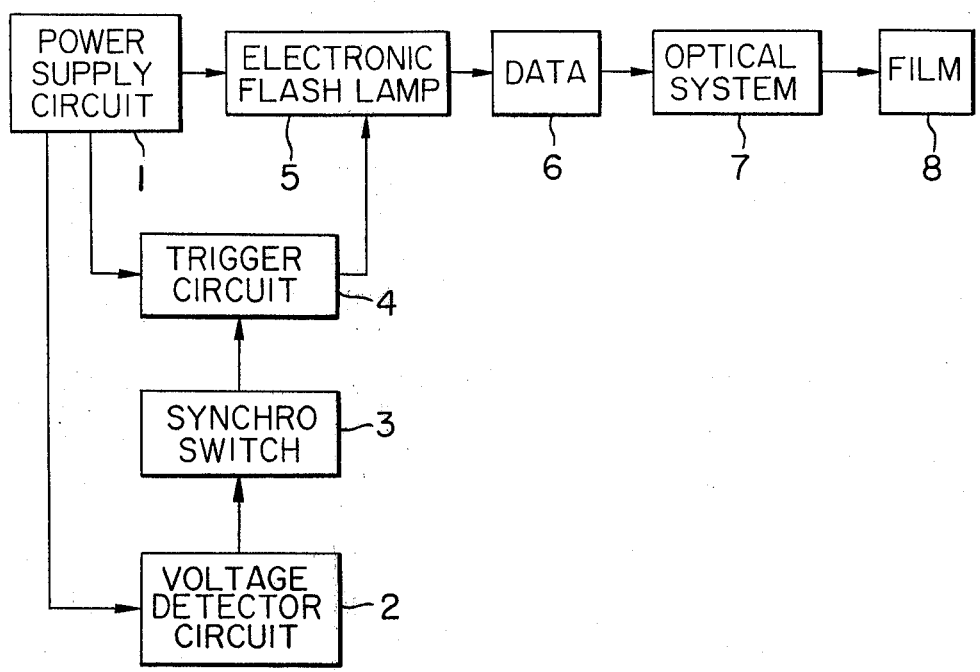
FIG. 1 is a block diagram of a data photographing system in accordance with the present invention.
Figure 2:
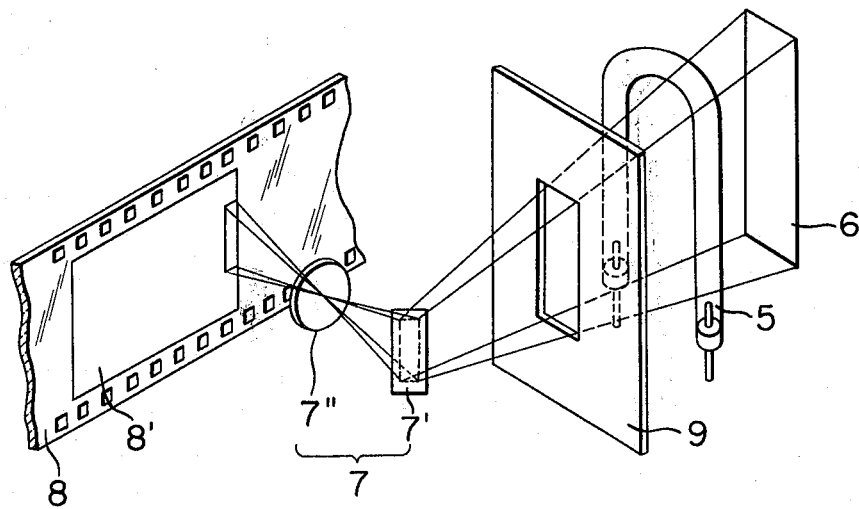
FIG. 2 is a perspective view of the optics of the data photographing system of FIG. 1.

FIGS. 1 and 2 illustrate the principles of a data photographing system according to the present invention for recording data, such as memoranda, the date or the time, on the film of a camera in addition to the scene being photographed. The device comprises a power supply circuit 1 which includes a flash capacitor 12 (see FIG. 3), an electronic flash lamp 5, such as a flash tube (FIG. 2), and a control circuit which includes a voltage detector circuit 2 for detecting when the flash capacitor has been completely charged, a synchronizing switch 3 which is adapted to be closed upon occurrence of shuttr release and which may be a "synchro" switch (FIG. 3) of known construction mounted in the body of the camera (not shown), and a trigger circuit 4 for triggering the flash lamp. The data to be photographed are designated by 6. An optical system 7, comprising a mirror 7' and a lens 7'', forms an image of the data on film 8, which has a plurality of frames 8' (only one of which is shown) within which the main scenes and the data may be photographed. Designated by 9 is a douser plate for intercepting any light from the electronic flash lamp 5 which is reflected by areas other than the area including the data.

When the flash capacitor in the power supply circuit 1 has been charged up to a predetermined voltage level required for providing a flash of predetermined desired brightness when the capacitor is discharged, such voltage is detected by the voltage detector circuit 2, which then assumes a condition for actuating the trigger circuit 4. However, the trigger circuit 4 for triggering flash lamp 5 cannot operate unless the synchro switch 3 is closed, because the switch is inserted between the circuits 2 and 4. Thus, the flash lamp 5 does not flash.

On the other hand, if shutter release has been effected for closing the synchro switch 3 before the flash capacitor attains the desired voltage level, the flash lamp 5 will not flash, because the voltage detector circuit 2 is not yet ready to actuate trigger circuit 4. Thus, the flash lamp 5 flashes only when synchro switch 3 is closed after the flash capacitor has been charged to the desired voltage level.

The light emitted from the flash lamp 5 may be modulated by reflection from the data 6, as shown in FIG. 2, or by transmission through the data, the modulated light passing through the optical system 7 to form an image of the data on the film 8.

Figure 3:
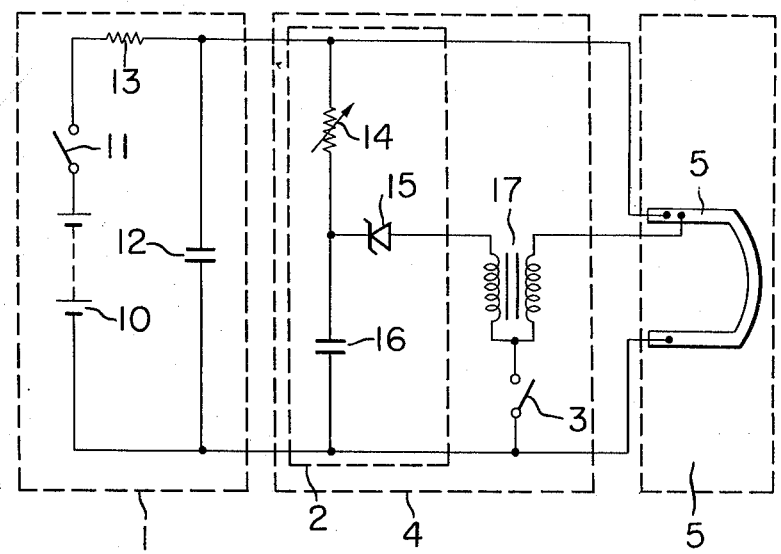
FIG. 3 is an electrical circuit diagram of a first embodiment of the invention.

A first embodiment of the present invention will now be described with reference to FIG. 3. Reference numberals 10 and 11 designate a DC power source, such as a battery, and a power switch, respectively. Designated by 12 is the above-described flash capacitor, which is connected in series with a resistor 13 and the power switch 11 between the positive and negative terminals of the power supply. The elements 10 to 13 together constitute the power supply circuit 1.

The voltage detector circuit 2 includes a variable resistor 14 and a trigger capacitor 16 connected in series across flash capacitor 12 (i.e., one end of the variable resistor is connected to the positive terminal of power source 10 through resistor 13 and power switch 11, while the other end of the variable resistor is connected to the negative terminal of the power source through the triggering capacitor 16). The voltage detector circuit further includes a voltage-controlled switching element, such as the Zener diode 15, which has its cathode connected to the junction of variable resistor 14 and triggering capacitor 16 and has its anode connected to one end of the primary or input winding of a triggering transformer 17. The other end of the primary winding of the triggering transformer 17 is connected to one terminal of synchro switch 3, which has its other terminal connected to the negative terminal of power source 10. One end of the secondary or output winding of the transformer is connected to the trigger terminal of the flash tube 5, while the other end of the secondary winding is connected to the terminal of synchro switch 3 which is connected to the primary winding. Although synchro switch 3 is shown connected between the triggering transformer 17 and the negative terminal of the power source, it will be readily apparent hereinafter that other connections of the switch are possible.

In this embodiment elements 14 to 17 and the synchro switch 3 together constitute the trigger circuit 4. The flash tube 5 is connected across the flash capacitor 12.

Operation of the above-described embodiment will now be described. When the power switch 11 is initially closed, the flash capacitor 12 begins to be charged by power source 10 through resistor 13. At the same time, triggering capacitor 16 begins to be charged through resistor 13 and variable resistor 14. As the voltage across the flash capacitor 12 increases, the voltage across the triggering capacitor 16 increases so that the voltage applied to the cathode of the Zener diode 15 also increases. When the voltage across the flash capacitor 12 has attained the proper level for being discharged by the flash tube 5, the voltage across the trigger capacitor 16 reaches the breakdown voltage of the Zener diode 15. If the synchro switch 3 is thereafter closed by actuation of the shutter release mechanism of the camera, the charge stored on trigger capacitor 16 will be discharged through the discharge circuit formed by the Zener diode, the primary winding of the transformer 17 and the synchro switch, which are at the time connected in series between the junction of trigger capacitor 16 and resistor 14 and the negative terminal of the power source.

The abrupt discharge of the trigger capacitor through the primary winding of the triggering transformer 17 causes the secondary winding of the transformer to produce a high voltage signal. This signal is applied to the trigger input terminal of the flash tube 5, which causes the flash tube to discharge the flash capacitor 12 therethrough for producing a flash of light for illuminating the data.

The variable resistor 14 is adjusted to the value which causes the voltage across the trigger capacitor 16 to reach the Zener breakdown voltage when the voltage across flash capacitor 12 is sufficient to enable the data to be photographed at the proper brightness level.

Figure 4:
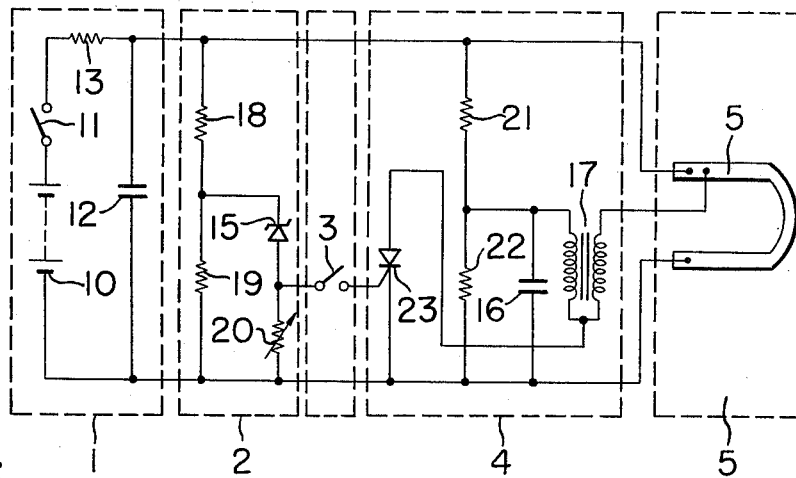
FIG. 4 is an electrical circuit diagram of a second embodiment of the invention.

FIG. 4 shows a second embodiment of the invention in which the voltage detector circuit 2 does not form part of the trigger circuit 4. Circuit elements which correspond to elements in the embodiment of FIG. 3 are designated by the same reference characters.

In this embodiment the voltage detector circuit 2 includes a pair of resistors 18 and 19 which are connected in series across flash capacitor 16 for forming a voltage divider with respect to the voltage across the flash capacitor. The circuit 2 also includes a voltage-controlled switching element, such as Zener diode 15, which is connected in series with a variable resistor 20, the Zener diode having its cathode connected to the junction of resistors 18 and 19 and having its anode connected to the negative terminal of the power source 10 through the variable resistor 20. The variable resistor 20 performs the same function as that of the variable resistor 14 in the embodiment of FIG. 3, which is adjustment of the voltage on flash capacitor 12 which is required to cause the Zener diode to conduct. Alternatively, resistor 19 may be a variable resistor and resistor 20 a fixed resistor.

The trigger circuit 4 includes resistors 21 and 22 which are connected in series across flash capacitor 12. The triggering capacitor 16 is connected in parallel with resistor 22, that is, between the negative terminal of the power source 10 and the junction of resistors 21 and 22. One end of the primary winding of triggering transformer 17 is connected to the junction of resistors 21 and 22 and the trigger capacitor 16, the other end of the primary winding being connected to one terminal of a switching element 23, such as the anode of a silicon controlled rectifier (hereinafter abbreviated SCR). The secondary winding of the triggering transformer is connected between the trigger terminal of flash tube 5 and the anode of the SCR. The cathode of the SCR is connected to the negative power terminal of the power source 10, while the gate thereof is connected through synchro switch 3 to the junction of Zener diode 15 and variable resistor 20.

Operation of the above-described second embodiment will now be described. When the power switch 11 is initially closed, flash capacitor 12 begins to be charged through the resistor 13. At the same time, the triggering capacitor 16 begins to be charged through resistors 13 and 21. As the voltage across the flash capacitor 12 increases, the voltage across Zener diode 15 and the variable resistor 20 increases. Variable resistor 20 is adjusted so that when the charge stored in the flash capacitor 12 reaches a level sufficient to enable desired flashing of the flash tube 5, the voltage across the reference diode 15 reaches the Zener breakdown voltage for thereby rendering the Zener diode conductive. At this moment, if the synchro switch 3 is in closed position ( i.e., if shutter release has occurred), current flows to the gate of SCR 23 through the Zener diode to cause the SCR to switch from the non-conducting state to the conducting state. The charge stored on the triggering capacitor 16 is then abruptly discharged through the discharge circuit formed by the primary winding of the triggering transformer 17 and the SCR for producing a trigger signal of stepped-up voltage across the secondary winding of the transformer. This trigger signal is applied to the trigger input of the flash tube for causing the flash tube to discharge the flash capacitor 12.

Figure 5:
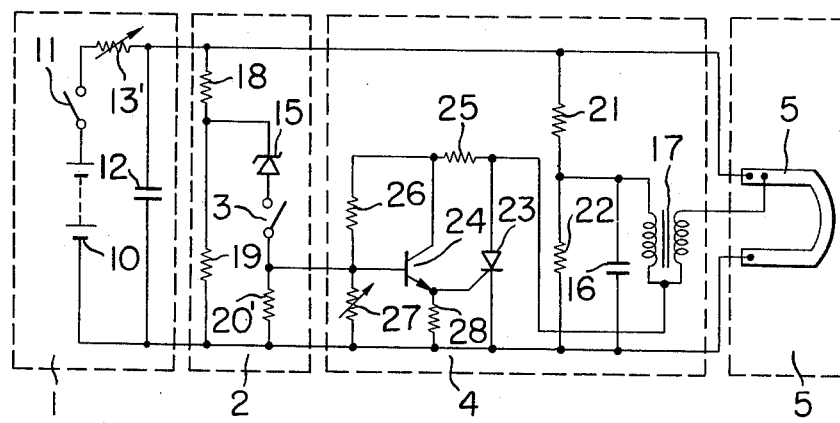
FIG. 5 is an electrical diagram of a third embodiment of the invention.

FIG. 5 shows a third embodiment in which the trigger circuit 4 includes an amplifier circuit for amplifying the current which is applied to the gate terminal of the SCR for triggering the SCR into conduction. Circuit elements which correspond to elements of the embodiment of FIG. 4 are designated by the same reference characters.

Specifically, the gate of SCR 23 is connected to the emitter of an amplifier transistor 24, the collector of the transistor being coupled to the anode of the SCR through a resistor 25. The base of the transistor is connected to the junction of a fixed resistor 26 and a variable resistor 27 which are connected in series between the collector of the transistor an the negative terminal of power source 10. The variable resistor 27 performs the same function as that of the variable resistor 20 in the second embodiment, shown in FIG. 4. Therefore, a fixed resistor 20' takes the place of the variable resistor 20 of the second embodiment. A resistor 28 is connected between the emitter of the transistor 24 and the negative terminal of the power source.

In the voltage detector circuit 2, the Zener diode 15 is connected in series with the synchro switch 3 and resistor 20' between the negative terminal of the power supply and the junction of voltage divider resistors 18 and 19. The junction of the synchro switch and resistor 20' is connected to the base of transistor 24.

For enabling the charging time of the flash capacitor 12 to be changed, a variable resistor 13' takes the place of fixed resistor 13 of the first and second embodiments.

In operation of this embodiment, Zener diode 15 and the synchro switch 3 cooperate to apply a current to the base of the transistor 24 when the shutter release mechanism of the camera has been actuated after the capacitor 12 has been sufficiently charged, and this current is amplified by the transistor and applied to the gate of the SCR for switching the SCR into conduction. In all other respects, operation of this embodiment is substantially identical to the operation of the second embodiment.

Operation of the data photographing systems of the invention with a camera operated in the continuous mode will now be described. If the resistor 13 (in the embodiments of FIGS. 3 and 4) or the variable resistor 13' (in the embodiment of FIG. 5) is set so that the minimum possible charge-discharge cycle of the flash capacitor 12 is 1 second, and if photography is effect continuously at a rate of five frames per second by means of a motor-driven device, for example, then the trigger circuit 4 will not be operated in response to each closing of synchro switch 3, because the voltage across the Zener diode 15 in the voltage detector circuit 2 cannot reach the Zener breakdown voltage before each such closing. As a result, the data will not be photographed every time the shutter release mechanism is actuated to photograph the main scene, but instead will be photographed at five-frame intervals. On the other hand, if continuous photography is effected at a rate of one frame per second or less, the data will be photographed in every frame, because the trigger circuit 4 is rendered operative at 1 second intervals.

Because the synchro switch 3 is connected within the trigger circuit 4 in the first embodiment (FIG. 3), between the voltage detector circuit 2 and the trigger circuit 4 in the second embodiment (FIG. 4), and within the voltage detector circuit 2 in the third embodiment (FIG. 5), it will be apparent that the circuit design of data photographing devices in accordance with the invention is flexible with respect to the location of the synchro switch.

Furthermore, although the embodiments show a Zener diode as the voltage detecting means, it will be apparent that other voltage detecting circuitry may be employed.

In summary, in data photographing systems in accordance with the present invention, the electronic flash lamp is caused to flash only when the synchro switch is closed after complete charging of the flash capacitor to a predetermined voltage substantially higher than the minimum voltage level which would permit the flash lamp to flash if it were not for the voltage detector circuit. Thus, systems of the invention may be employed with cameras of the type having a motor-driven device for effecting continuous photography. Moreover, because the systems of the invention eliminate the need for using a pilot lamp to indicate when charging has been completed, the systems can be employed with cameras which are operated by remote control.

Furthermore, the fact that flashing of the flash lamp can take place only after complete charging of the flash capacitor ensures that the data will be photographed in the film frames with the proper brightness. Moreover, the brightness of the photographed data will never fall below a predetermined level, even if the power supply battery becomes consumed to an extent which causes the supply voltage to decrease. However, the rate at which the data is photographed would be somewhat lower in such a case due to the resulting lengthening of the charge-discharge cycle of the flash capacitor.

As described previously, the rate at which the data are photographed is sufficient if it satisfies the practical requirements of such data. Consequently, it is not necessary that certain types of data, such as the time, be photographed every time that the camera is operated to photograph the main scene. This enables the size of the power sources employed in the systems of the invention in such cases to be smaller than necessary in those cases where data are photographed in every frame during continuous photography.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. A data photographing system for recording on the film of a camera, on which a scene is photographed, data illuminated by flash, the system comprising:
   capacitor means;
   means for applying a charge to said capacitor means;
   electronic flash means adapted to discharge said capacitor means to illuminate the data at a brightness dependent upon the voltage level to which said capacitor means is charged; and
   control means for causing said electronic flash means to discharge said capacitor means upon actuation of the shutter release mechanism of the camera if the voltage on said capacitor means has reached a predetermined voltage level required for providing a flash of predetermined brightness and for preventing said electronic flash means from discharging said capacitor means when the voltage on said capacitor means is less than said predetermined level and is thus incapable of producing a flash of said predetermined brightness, and predetermined voltage level being substantially higher than the minimum voltage level which would permit said electronic flash means to provide a flash.

2. A system as set forth in claim 1, wherein said control means comprises voltage detector means for detecting the voltage across said capacitor means and a synchronizing switch adapted to be closed upon actuation of the shutter release mechanism of the camera, the voltage detector means and the synchronizing switch cooperating to cause said electronic flash means to discharge said capacitor means upon closing of said synchronizing switch only if the voltage detected by said detector means has reached said predetermined level.

3. A system as set forth in claim 2, wherein said electronic flash means is adapted to discharge said capacitor means in response to a trigger signal, and wherein said control means comprises a trigger capacitor, means for charging said trigger capacitor in accordance with the charge on said capacitor means, means including said voltage detector means and said synchronizing switch for discharging said trigger capacitor upon closing of said synchronizing switch means only if the voltage detected by said detector means has reached said predetermined level, and means responsive to the discharging of said trigger capacitor for producing said trigger signal.

4. A system as set forth in claim 3, wherein said voltage detector means comprises voltage-controlled switching means, and wherein said means for discharging said trigger capacitor comprises said voltage-controlled switching means connected in series with said synchronizing switch across said trigger capacitor.

5. A system as set forth in claim 4, wherein said voltage-controlled switching means comprises a Zener diode.

6. A system as set forth in claim 4, wherein said means responsive to discharging of said trigger capacitor comprises a transformer having an input winding and an output winding, the input winding connected in series with said voltage-controlled switching means and said synchronizing switch for producing said trigger signal at said output winding in response to said discharging of said trigger capacitor.

7. A system as set forth in claim 3, wherein said voltage detector means and said synchronizing switch cooperate to produce a switching signal upon closing of said synchronizing switch only if the voltage detected by said detector means has reached said predetermined level, and wherein said means for discharging the trigger capacitor further comprises additonal switch means for discharging the trigger capacitor therethrough in response to said switching signal.

8. A system as set forth in claim 7, wherein said means responsive to the discharging of said trigger capacitor comprises a transformer having an input winding and an output winding, the input winding connected in series with said additional switch means across said trigger capacitor for producing said trigger signal at said output winding in response to said discharging of said trigger capacitor.

9. A system as set forth in claim 7, wherein said additional switch means comprises an SCR.

10. A system as set forth in claim 9, further comprising means for amplifying said switching signal and for applying the amplified signal to the gate terminal of said SCR.

11. A system as set forth in claim 2, wherein said voltage detector means comprises voltage-controlled switching means adapted to conduct current when the voltage on said capacitor means reaches said predetermined voltage level.

12. A system as set forth in claim 11, wherein said voltage-controlled switching means comprises a Zener diode.

13. A system as set forth in claim 11, wherein said synchronizing switch is connected in series with said voltage-controlled switching means.

14. A system as set forth in claim 2, wherein said voltage detector means includes voltage divider means connected across said capacitor means.

15. A system as set forth in claim 2, wherein said means for applying a charge to said capacitor means includes variable resistance means for varying the charging time of said capacitor means.

16. A system as set forth in claim 1, wherein said predetermined level is the voltage level corresponding to substantially full charging of said capacitor means from said charge applying means.

* * * * *